United States Patent [19]

Asahara

[11] Patent Number: 4,851,898
[45] Date of Patent: Jul. 25, 1989

[54] SEPARATION CIRCUIT USING ADAPTIVE COMB FILTER FOR SEPARATING LUMINANCE AND COLOR DIFFERENCE SIGNALS IN COMPOSITE COLOR TV SIGNAL

[75] Inventor: Shuichi Asahara, Yokohama, Japan

[73] Assignee: Victor Company of Japan Ltd., Yokohama, Japan

[21] Appl. No.: 171,075

[22] Filed: Mar. 21, 1988

[30] Foreign Application Priority Data

Mar. 20, 1987 [JP] Japan ................... 62-66539

[51] Int. Cl.$^4$ ............................................. H04N 9/78
[52] U.S. Cl. ................................................. 358/31
[58] Field of Search ......................................... 358/31

[56] References Cited

U.S. PATENT DOCUMENTS

| 4,050,084 | 9/1977 | Rossi | 358/31 |
| 4,178,609 | 12/1979 | Beutel | 358/31 |
| 4,241,363 | 12/1980 | Maeyama et al. | 358/31 |

FOREIGN PATENT DOCUMENTS

| 1170760 | 7/1984 | Canada | 358/31 |
| 188584 | 8/1987 | Japan . | |
| 2054313 | 2/1981 | United Kingdom | 358/31 |

Primary Examiner—John W. Shepperd
Attorney, Agent, or Firm—Fleit, Jacobson, Cohn, Price, Holman & Stern

[57] ABSTRACT

A separation circuit for separating luminance and color difference signals in a composite color signal has first and second 1H-delay circuits delaying the input signal. First, second and third bandpass filters respectively filter the input, 1H-delayed and 2H-delayed color signals, the output of the second bandpass filter being inverted. A first adder circuit provides the arithmetic mean of the first and third bandpass filter outputs at a level a to a differential amplifier to which is applied the inverted signal at a level b from the second bandpass filter. The differential amplifier outputs a signal having a level (b-a)k+b, where k is a constant. A middle level output circuit outputs the middle level signal from among the outputs of the first and third bandpass filters and differential amplifiers. A second adder circuit outputs the arithmetic mean of the middle level signal and inverted signal from the second bandpass filter as the separated color difference signal. The output from the first delay circuit is also passed through a further delay circuit and supplied to a third adder circuit where the arithmetic mean of this signal and the ouptut from the second adder circuit yields the separated luminance signal. In one embodiment, the second bandpass filter is replaced by a bandpass filter group having a bandpass stage and a band-elimination stage with complementary characteristics. A further adder circuit receives the signal from the bandpass stage and the middle level signal and supplies the arithmetic mean thereof to the third adder circuit which also receives the band-eliminated signal and provides the arithmetic mean therefrom as the separated luminance signal.

3 Claims, 6 Drawing Sheets

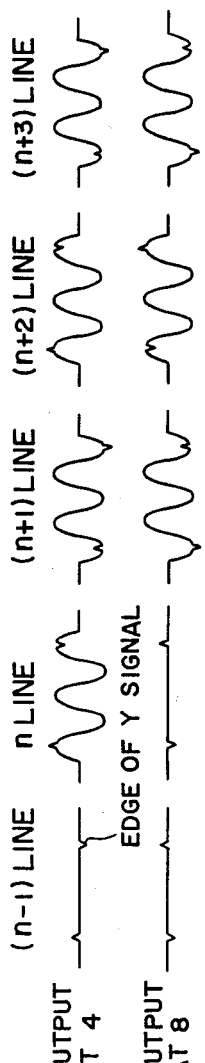

| | INPUT STATE | | | | OUTPUT AT EACH BLOCK | | | | | | |
|---|---|---|---|---|---|---|---|---|---|---|---|
| | A | B | C | | 9 | 10 | 11 | 12 | 13 | 14 | 15 |
| FIG. 3A | \ | o—o | A>B>C | | B | C | B | A | B | B | $\frac{B+B}{2}$ |
| FIG. 3B | o\ | o | A>C>B | | B | B | B | A | B | C | $\frac{B+C}{2}$ |
| FIG. 3C | o | /o | C>A>B | | B | B | B | A | C | A | $\frac{B+A}{2}$ |
| FIG. 3D | o | \o | C>B>A | | A | B | B | B | C | B | $\frac{B+B}{2}$ |
| FIG. 3E | o | o/ | B>C>A | | A | C | C | B | B | B | $\frac{C+B}{2}$ |
| FIG. 3F | /o | \o | B>A>C | | A | C | A | B | B | B | $\frac{A+B}{2}$ |

PRIOR ART

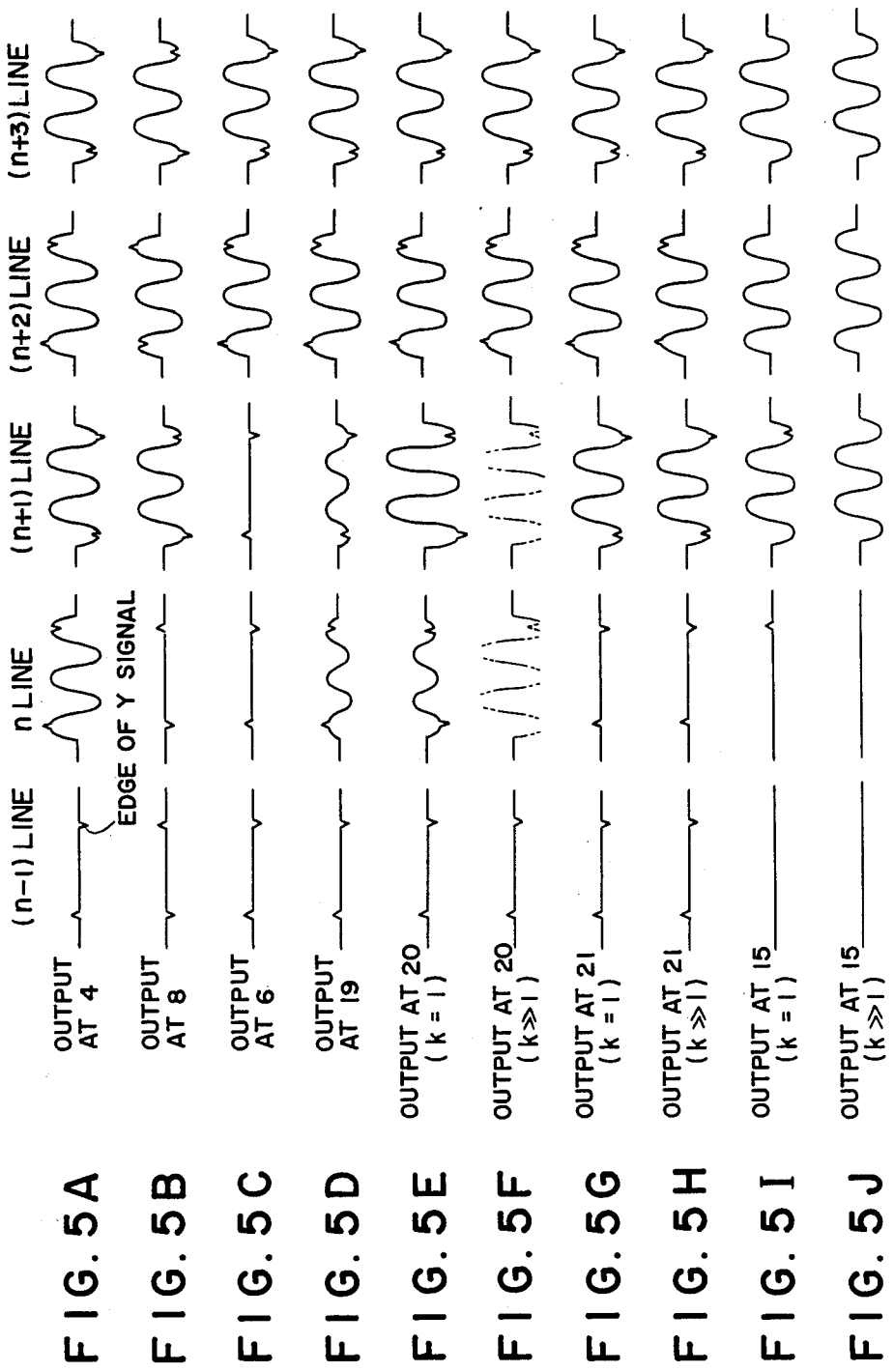

(2 INPUTS)

(3 INPUTS)

(2 INPUTS)

SEPARATION CIRCUIT USING ADAPTIVE COMB FILTER FOR SEPARATING LUMINANCE AND COLOR DIFFERENCE SIGNALS IN COMPOSITE COLOR TV SIGNAL

BACKGROUND OF THE INVENTION

The present invention relates to a separation circuit for separating a composite color television signal into a luminance signal and a color difference signal.

An example of methods for reproducing a color image of a received composite color television signal is to separate a color television signal into a luminance signal and a color difference signal.

According to the NTSC system, the luminance signal and the color difference signal are frequency interleaved and the color difference signal is inverted in phase every one horizontal scanning period (1H). Therefore, so-called comb filters are used wherein a 1H delayed color televison signal is added to a color difference signal to effect signal separation between a luminance signal and a color difference signal.

A conventional separation circuit for a luminance signal and a color difference signal however poses a problem that an edge portion of the luminance signal is mixed into the color difference signal, resulting in poor color reproduction and the like.

SUMMARY OF THE INVENTION

It is therefore an object of the present invention to provide a separation circuit capable of effecting signal separation between a luminance signal and a color difference signal with high fidelity and without mixing a part of a luminance signal into the color difference signal.

It is another object of the present invention to provide a separation circuit for a luminance signal and a color difference signal capable of realizing accurate color reproduction.

According to the present invention, a separation circuit for a luminance signal and a color difference signal is provided which comprises: a first delay circuit for delaying a color television signal by one horizontal scan; a second delay circuit for delaying said one horizontal scanning period delayed color television signal by a further one horizontal scanning period; a first band-pass filter for passing a color difference signal bandwidth of said color television signal; a second band-pass filter for passing a color difference signal bandwidth of an output signal from said first delay circuit; a third band-pass filter for passing a color difference signal bandwidth of an output signal from said second delay circuit; an inverter for inverting the polarity of an output signal from said second band-pass filter; a first addition circuit for obtaining an arithmetic mean of output signals from said first and third band-pass filters; a differential amplifier circuit for receiving an output signal (level a) from said first addition circuit and an output signal (level b) from said inverter and outputting a signal having a level (b-a)k +b (where k is a constant); a middle level signal output circuit for delivering one of the output signals from said differential amplifier circuit and said first and third band-pass filters, said delivered signal being that having the second largest amplitude among said output signals; a second addition circuit for receiving output signals from said middle level signal output circuit and said inverter and outputting an arithmetic mean thereof as a color difference signal; and a third addition circuit for adding an output from said first delay circuit to an output from said second addition circuit to output a luminance signal.

According to one aspect of the present invention, in separating a color difference signal from a color television signal, an edge portion of the luminance signal delivered from a band-pass filter is not mixed with the color difference signal so that a accurate color difference signal can be obtained.

Other objects and advantages of this invention will become apparent from the following description taken in connection with the accomplying drawings.

BRIEF DESCRIPTION OF THE DRAWINGS

In the accompanying drawings:

FIG. 2A to 2J show waveforms obtained at each block shown in FIG. 1;

FIG. 3A through 3F illustrate output signals at each block shown in FIG. 1;

FIGS. 5A to 5J show waveforms obtained at each block shown in FIG. 4;

FIG. 11A is a circuit diagram showing an example of the band-pass filter 22a.

DESCRIPTION OF THE PREFERRED EMBODIMENTS

A related background art will first be described with reference to the accompanying drawings in order to better understand the present invention.

Figure 1:
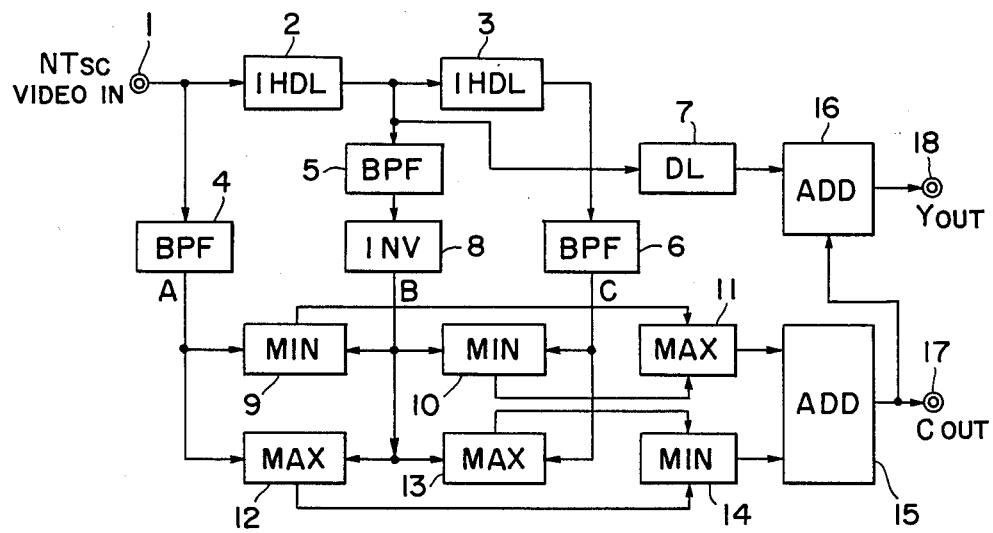
FIG. 1 is a block diagram showing a conventional separation circuit for a luminance signal and a color difference signal.

FIG. 1 is a block diagram showing a conventional separation circuit for a luminance signal and a color difference signal employing the NTSC system with comb filters.

In the figure, a color television signal supplied to an input terminal 1 is fed to a band-pass filter BPF 4 for passing a color difference signal bandwidth of a modulated color difference signal and a delay circuit 1HDL 2 for delaying the color television signal by 1H and further to a delay circuit 1HDL 3. Output signals from 1HDL 2 and 1HDL 3 are supplied to BPF 5 and BPF 6, respectively. An output signal from 1HDL 2 is serially supplied via a delay circuit DL 7 having a group delay characteristic same as that of BPFs 4, 5 and 6 to ADD 16 which delivers its signal to an output terminal 18 for outputting a luminance signal.

An output signal from BPF 4 is supplied to one input terminals of a minimum level signal output circuit MIN 9 which outputs a smaller level signal between two signals inputted thereto and a maximum level signal output circuit MAX 12 which outputs a larger level signal between two signals inputted thereto, whereas an output signal from BPF 5 is supplied via an inverter INV 8 for inverting signal polarity to the other input terminals of MIN 9 and MAX 12 and to one input terminals of MIN 10 and MAX 13, which have the same function as MIN 9 and MAX 12.

An output signal from BPF 6 is supplied to the other input terminals of MIN 10 and MAX 13. Output signals from MIN 9 and MIN 10 are supplied to MAX 11, whereas output signals from MAX 12 and MAX 13 are supplied to MIN 14.

Output signals from MAX 11 and MIN 14 are supplied to an adder circuit ADD 15 whose output is delivered to its output terminal 17 for outputting a color difference signal and supplied to ADD 16. ADDs 15 and 16 obtain an arithmetic mean of two signals inputted thereto.

The operation of the separation circuit for a luminance signal and a color difference signal constructed as above will be described with reference to FIGS. 1 to 3.

FIGS. 2A through 2J show wavefroms obtained at each block shown in FIG. 1 and FIGS. 3A through 3F illustrate output signals at each block shown in FIG. 1.

A color television signal applied to the input terminal 1 is delayed by 1H (63.555 micro-seconds) at each of 1HDL 2 and 1HDL 3. BPL 4 through BPF 6 each have a center frequency of 3.58 MHz and pass the color difference signal bandwidth of a color television signal.

An output signal only from BPF 5 is inverted in polarity by INV 8.

Each output signal from BPF 4, BPF 5 (INV 8) and BPF 6 passes not only the color difference signal but also the edge portion of the luminance signal waveform so that triangular waves as shown in FIGS. 2A to 2J is passed. Sine waves shown in FIG. 2 represent color difference signals which are entered starting from n-th line.

Assuming that output signals from BPF 4, INV 8 and BPF 6 are represented by A, B and C, respectively, a combination of amplitude differences among signals A, B and C includes six types as shown in FIG. 3. MIN 9 outputs a smaller level signal between two signals A and B inputted thereto and MIN 10 outputs a smaller level signal between two signals B and C imputted thereto. Therefore, signals as shown in FIGS. 3A to 3F are obtained.

On the other hand, MAX 12 outputs a larger level signal between two signals A and B inputted thereto and MAX 13 outputs a larger level signal between two signals B and C imputted thereto. Therefore, signals as shown in FIGS. 3A to 3F are obtained.

Similarly, MAX 11 outputs a larger level signal between two output signals from MIN 9 and MIN 10 and MIN 14 outputs a smaller level signal between two output signals from MAX 12 and MAX 13. Therefore, output signals from MAX 11 and MIN 14 as shown in FIGS. 3A to 3F are obtained.

The output signals from MAX 11 and MIN 14 are subjected to arithmetic mean operation by ADD 15 to obtain signal values as shown in FIGS. 3A to 3F. It is to be noted that the output signal from ADD 15 is an arithmetic mean of signal B and the second largest signal among signals A, B and C.

Namely, of the output signals from ADD 15, those signals shown in FIGS. 3B, 3C, 3E and 3F take a value (B+C)/2 or (A+B)/2. Since the edge portions of the luminance signal are opposite in phase for signals B and C, or A and B, the edge portions are cancelled out at ADD 15 while the color difference signals are obtained at ADD 15 due to the same phase, thus attaining the comb filter effect.

However, those signals shown in FIGS. 3A and 3D take a value (B+B)/2. Therefore, the edge portions cannot be cancelled out so that the edge portions of the luminance signal mixed with the color difference signal appear at the output terminal 17.

Therefore, dependent on the levels of signals A, B and C, there occurs a case where the comb filter effect cannot be enjoyed and the edge portions of the luminance signal are mixed with the color difference signal.

In the meantime, the color difference signal from ADD 15 and that of the television signal 1H delayed by 1HDL 2 are opposite in phase so that an arithmetic mean thereof obtained by ADD 16 is a luminance signal to be delivered to the output terminal 17, with the color difference signals being cancelled out.

Figure 4:
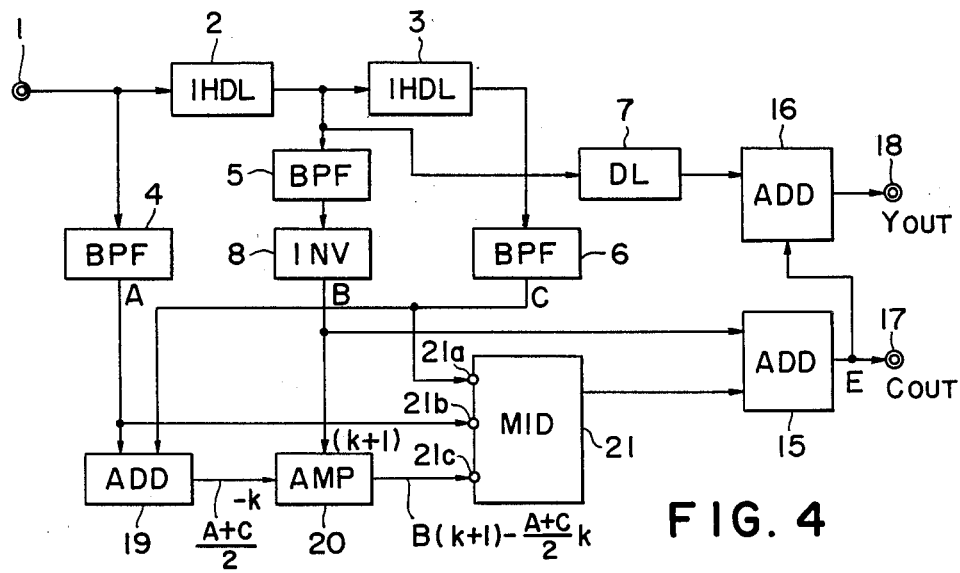
FIG. 4 is a block diagram showing an embodiment of a separation circuit for luminance signal and a color difference signal according to the present invention.

FIG. 4 is a block diagram showing a first embodiment of a separation circuit for a luminance signal and a color difference signal. In the first embodiment, the present invention is applied to the NTSC system and similar elements to those shown in FIG. 1 are represented by using identical reference numerals.

In the figure, reference numeral 1 denotes an input terminal for a color television signal, 2 and 3 denote delay circuits 1HDL for delaying the color television signal by 1H, 4, 5 and 6 band-pass filters for passing a color difference signal bandwidth of a modulated color difference signal, 7 denotes a delay circuit having a group delay characteristic same as that of BPSs 4, 5 and 6, 8 an inverter INV for inverting signal polarity, 15, 16 and 19 denote adder circuits ADD for obtaining an arithmetic mean of two signals inputted thereto, 17 denotes an output terminal for a color difference signal, 18 an output terminal for a luminance signal, 20 an operational amplifier circuit AMP whose gain relative to a positive input terminal is larger than that relative to a negative input terminal by 1, and 21 a middle level signal output circuit MID for delivering the second largest level signal among three signals inputted thereto.

A color television signal supplied to the input terminal 1 is fed to BPF 4 and 1HDL 2 and further to 1HDL 3. The output signals from 1HDL 2 and 1HDL 3 are supplied to BPF 5 and BPF 6, respectively. An output signal from 1HDL 2 serially supplied via DL 7 to ADD 16 which delivers its signal to the output terminal 18.

An output signal from BPF 4 is supplied to one input terminal of ADD 19 and to an input terminal 21b of MID 21, an output signal from BPF 5 is supplied via INV 8 to the positive input terminal of AMP 20, and an output signal from BPF 6 is supplied to the other input terminal of ADD 19 and to an output terminal 21a of MID 21.

An output signal from ADD 19 is supplied to the negative input terminal of AMP 20 whose output signal is supplied to an input terminal 21c of MID 21.

An output signal from MID 21 is supplied to the other input terminal of ADD 15 whose output signal is delivered to the output terminal 17 and supplied to ADD 16.

The operation of the separation circuit for a luminance signal and a color difference signal constructed as above will be described.

FIG. 5 shows waveforms obtained at each block shown in FIG. 4. A color television signal applied to the input terminal 1 is delayed by 1H (63.555 microseconds) at each of 1HDL 2 and 1HDL 3.

BPF 4 through BPF 6 each have a center frequency of 3.58 MHz and pass the color difference signal bandwidth of a color television signal. An output signal only from BPF 5 is inverted in polarity by INV 8.

Each output signal from BPF 4, BPF 5 (INV 8) and BPF 6 passes not only the color difference signal but also the edge portion of the luminance signal so that a triangular wave as shown in FIG. 5 is passed. Sine waves shown in FIG. 2 represent color difference signals which are entered starting from n-th line.

Assuming that output signals from BPF 4, INV 8 and BPF 6 are represented by A, B and C, respectively, an output signal from ADD 19 becomes $(A+C)/2$.

Figure 6:
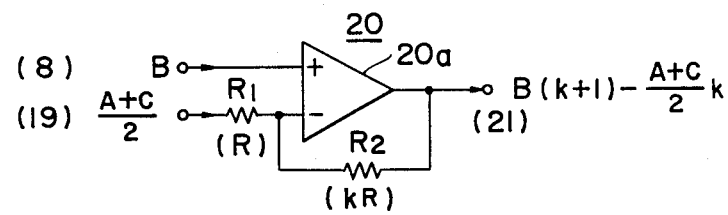
FIG. 6 is a circuit diagram showing an example of the differential amplifier circuit AMP 20.

AMP 20 may use a circuit as shown in the circuit diagram of FIG. 6 wherein an input resistor R1 connected to the negative input terminal of a differential amplifier 20a and a negative feedback resistor R2 are set to have a ratio k. Therefore, the differential amplifier circuit AMP 20 has a gain relative to the positive input terminal larger than that relative to the negative input terminal by 1.

An input signal to the positive input terminal is signal B and an input signal to the negative input terminal is signal $(A+C)/2$ outputted from ADD 19. Therefore, an output signal from AMP 20 becomes $B(k+1)-k(A+C)/2=B+k[B-(A+C)/2]$.

MID 21 delivers the second largest signal among those signals C, A and $B+k[B-(A+C)/2]$ supplied to the input terminals 21a to 21c, respectively. This delivered signal is expressed here by the following function:

$$MID(C, A, B+k[B-(A+C)/2])$$

Therefore, an output signal E from ADD 15 can be expressed by the following function:

$$2E=B+MID(C, A, B+k[B-(A+C)/2])$$

Assuming $k=1$, then $$2E=B+MID(C, A, 2B-(A+C)/2)$$

In this case, since there occurs a case that the term $(2B-(A+C)/2)$ may be delivered to the output terminal 17, the comb filter effect is not sufficient, thus leaving a fraction of the edge portion of the luminance signal as shown in FIG. 5(I).

In view of this, k is set considerably larger than 1, i.e., $k>1$. Then, the right term $(B+k[B-(A+C)/2])$ in the equation:

$$2E=B+MID(C, A, B+k[B-(A+C)/2])$$

will become a largest or smallest term so that MID 21 can deliver the signal near to signal B (second largest) between signals A and C.

Consequently, a signal delivered from ADD 15 becomes $(A+B)/2$ or $(B+C)/2$. Since the edge portions of the luminance signal are opposite in phase for signals A and B, or B and C, the edge portions are cancelled out at ADD 15 while the color difference signals are obtained at ADD 15 due to the same phase, thus completely attaining the comb filter effect as shown in FIG. 5(J).

In the meantime, the color difference signal from ADD 15 and that of the television signal 1H delayed by 1HDL 2 are opposite in phase so that an arithmetic mean thereof obtained by ADD 16 is a luminance signal to be delivered to the output terminal 17, with the color difference signals being concelled out.

Figure 7:
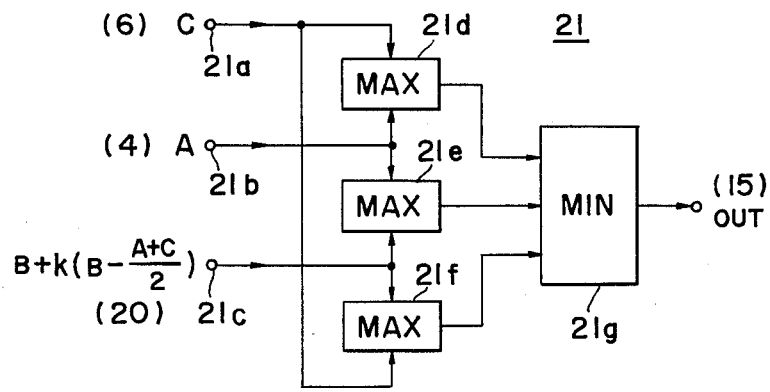
FIG. 7 is a circuit diagram showing an example of the middle level signal output circuit MID 21.

MID 21 may use a circuit as shown in the block diagram of FIG. 7, which circuit is constructed of maximum level signal output circuits MAX 21d, MAX 21e and 21f and a minimum level signal output circuit MIN 21g. MAX 21d outputs a larger level signal between two signals inputted to input terminals 21a and 21b. MAX 21e outputs a larger level signal between two signals inputted to input terminals 21b and 21c. MAX 21f outputs a larger level signal between two signals inputted to input terminals 21c and 21a. MIN 21g outputs the smallest level signal among those signals outputted from MAX 21d, MAX 21e and MAX 21f.

In other words, MAX 21d, MAX 21e and MAX 21f output the first and second largest signals among those signals applied to the input terminals 21a, 21b and 21c. A smaller level signal between the first and second largest signals, i.e., the second largest signal of all the signals, is outputted by MIN 21g.

Figure 8A:
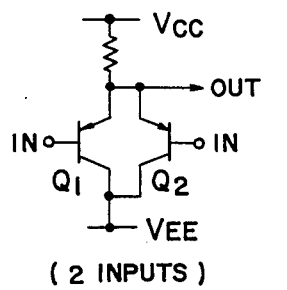
FIGS. 8A and 8B are circuit diagrams showing examples of the minimum level signal output circuit MIN 21g.
Figure 8B:
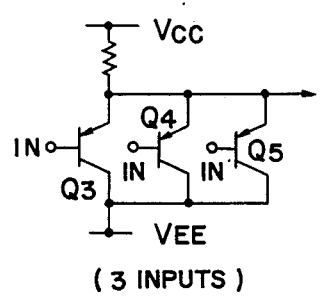
Figure 9:
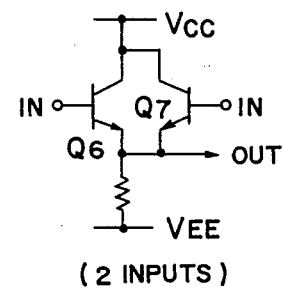
FIG. 9 is a circuit diagram showing an example of the maximum level signal output circuits MAX 21d to 21f.

FIGS. 8A and 8B and FIG. 9 show examples of the minimum circuits of MIN 21g, and the maximum circuits of MAX 21d, MAX 21e and MAX 21f. FIG. 8A shows a minimum circuit having two imputs which is composed of a differential amplifier Q1, Q2 and FIG. 8B shows a minimum circuit having three inputs which is composed of three transistors Q3-Q5. The maximum circuit shown in FIG. 9 also uses a differential amplifier Q6, Q7. These circuits using transistors are well-known so that the description of their operation is omitted.

Figure 10:
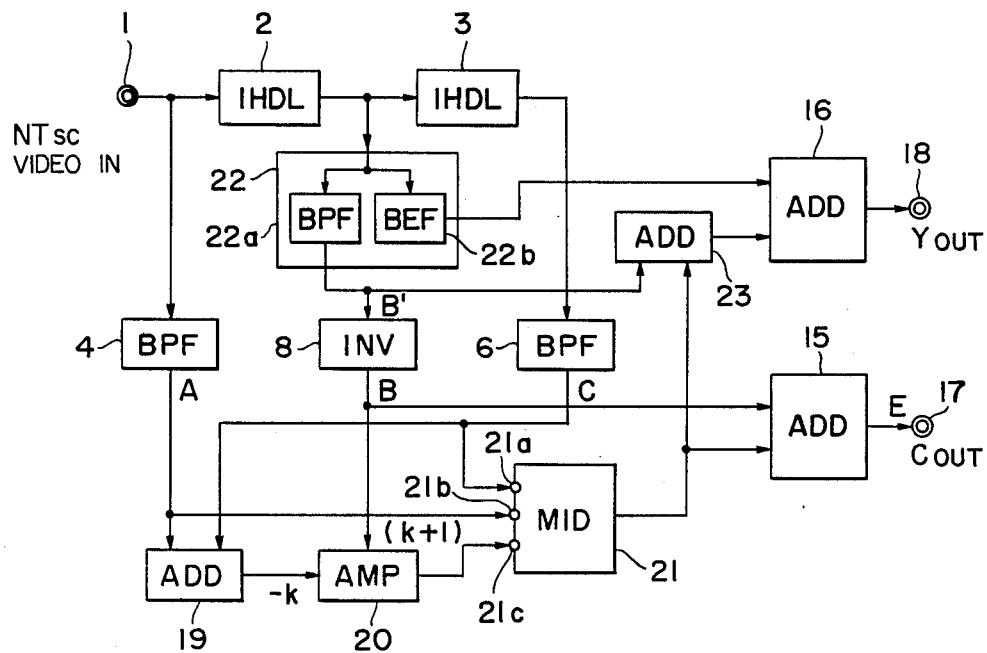
FIG. 10 is a block diagram showing a second embodiment of a separation circuit for a luminance signal and a color difference signal according to the present invention.

FIG. 10 is a block diagram showing a second embodiment of a separation circuit for a luminance signal and a color difference signal. In FIG. 10, similar elements to those shown in FIG. 1 are represented by using identical reference numerals.

Reference numeral 22 denotes a band-pass filter group constructed of a band-pass filter BPF 22a having the same characteristic as those of BPF 4 and BPF 6, and a band-elimination filter BEF 22b having a characteristic complementary to that of BPF 22a. Reference numeral 23 denotes an adder circuit ADD similar to ADD 15 and ADD 16.

A color television signal supplied to the input terminal 1 is fed to BPF 4 and 1HDL 2 and further to 1HDL 3. An output signal from 1HDL 2 is supplied to BPF 22a and BEF 22b. An output signal from 1HDL 3 is supplied to BPF 6.

An output signal from BEF 22b is supplied to one input terminal to ADD 16 whose output signal is delivered to the output terminal 18. An output signal from BPF 22a is supplied to INV 8 and one input terminal of ADD 23.

An output signal from BPF 4 is supplied to one input terminal of ADD 19 and an input terminal 21b of MID 21, an output signal from INV 8 is supplied to the positive input terminal of AMP 20, and an output signal from BPF 6 is supplied to the other input terminal of ADD 19, and to an input terminal 21a of MID 21.

An output signal from ADD 19 is supplied to the negative input terminal of AMP 20 whose output signal is supplied to an input terminal 21c of MID 21.

An output signal from MID 21 is supplied to the other terminals of ADD 15 and ADD 23. An output signal from ADD 15 is delivered to the output terminal 17, while an output signal from ADD 23 is supplied to ADD 16.

Figure 11A:
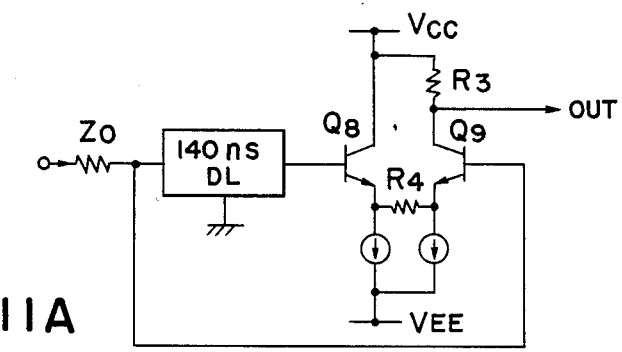
Figure 11B:
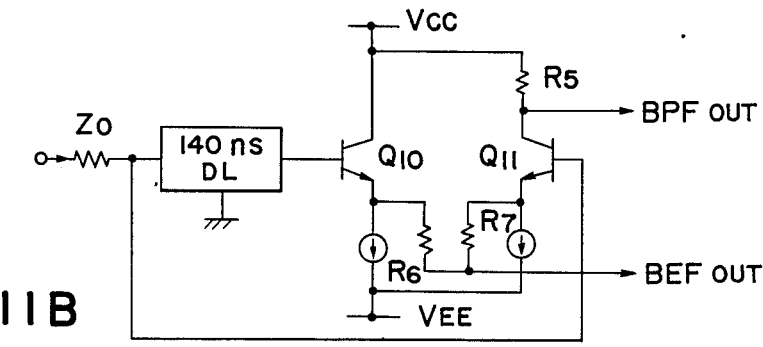
FIG. 11B is a circuit diagram showing an example of the filter group 22.

FIG. 11A shows an example of a circuit of BPF 22a, and FIG. 11B shows an example of a circuit of the filter group 22 each using a delay line and a differential amplifier.

A signal appearing at the output terminal 17 as a color difference signal is obtained in quite the same operation as described with the first embodiment.

It is assumed here that output signals from BPF 4, INV 8, BPF 6 and BPF 22a are represented by A, B, C and B', respectively. The luminance signal is derived by ADD 16 as an arithmetic mean of a television signal whose color difference signal bandwidth was removed by BEF 22b and whose phase was delayed by 1H, and a signal (A+B')/2 or (B'+C)/2 from ADD 23.

In this case, since the color difference signals contained in signals A and B', or B'and c are in opposite phase, they are cancelled out and are not outputted from ADD 23, whereas since the edge portions of the luminance signals sent from BPF 4, BPF 6 and BPF 22a are in same phase, they are sent out to obtain a complete luminance signal from ADD 16.

Although the first and second embodiments have been described in connection with the NTSC system, the present invention is also applicable to the PAL system. Since the phase difference of color difference signals between 1H is 90 degrees for the PAL system, it becomes necessary to have the overall phase difference of 180 degrees, for example, by means of suitable phase shifters.

What is claimed is:

1. A separation circuit for a luminance signal and a color difference signal comprising:
    a first delay circuit for delaying a color television signal by one horizontal scanning period;
    a second delay circuit for delaying said one horizontal scanning delayed color television signal by a further one horizontal scanning period;
    a first band-pass filter for passing a color difference signal bandwidth of said color television signal;
    a second band-pass filter for passing a color difference signal bandwidth of an output signal from said first delay circuit;
    a third band-pass filter for passing a color difference signal bandwidth of an output signal from said second delay circuit;
    an inverter for inverting the polarity of an output signal from said second band-pass filter;
    a first adder circuit for obtaining an arithmetic mean of output signals from said first and third band-pass filters;
    a differential amplifier circuit for receiving an output signal (level a) from said first adder circuit and an output signal (level b) from said inverter and outputting a signal having a level (b-a)k+b (where k is a constant);
    a middle level signal output circuit for delivering one of the output signals from said differential amplifier circuit and said first and third band-pass filters, said delivered signal being that having the second largest amplitude among said output signals;
    a second adder circuit for receiving output signals from said middle level signal output circuit and said inverter and outputting an arithmetic mean thereof as a color difference signal; and
    a third adder circuit for adding an output from said first delay circuit to an output from said second adder circuit to output a luminance signal.

2. A separation circuit according to claim 1, wherein said middle level signal output circuit comprises three maximum level signal output circuits each comparing two out of three signals supplied to said middle level signal output circuit for outputting a signal with a larger amplitude, and a minimum level signal output circuit for delivering one of three respective output signals from said three maximumm level signal output circuits, said delivered signal being that having a minimum amplitude among said three output signals.

3. A separation circuit for a luminance signal and a color difference signal comprising:
    a first delay circuit for delaying a color television signal by one horizontal scanning period;
    a second delay circuit for delaying said one horizontal scan delayed color television signal by a further one horizntal scanning period;
    a first band-pass filter for passing a color difference signal bandwidth of said color television signal;
    a second band-pass filter for passing a color difference signal bandwidth of an output signal from said first delay circuit;
    a third band-pass filter for passing a color difference signal bandwidth of an output signal from said second delay circuit;
    a band-elimination filter for passing a bandwidth, complementary to said color difference signal bandwidth, of an output signal from said first delay circuit;
    an inverter for inverting the polarity of an output signal from said second band-pass filter;
    a first adder circuit for obtaining an arithmetic mean of output signals from said first and third band-pass filters;
    a differential amplifier circuit for receiving an output signal (level a) from said first adder circuit and an output signal (level b) from said inverter and outputting a signal having a level (b-a)k+b (where k is a constant);
    a middle level signal output circuit for delivering one of the output signals from said differential amplifier circuit and said first and third band-pass filters, said delivered signal being that having the second largest amplitude among said output signals;
    a second adder circuit for receiving output signals from said middle level signal output circuit and said inverter and outputting an arithmetic mean thereof as a color difference signal; and
    a third adder circuit for adding and output from said second band-pass filter to an output from said middle level signal output circuit; and
    a forth adder circuit for adding an output from said third adder circuit to an output of said band-elimination filter to output a luminance signal.

* * * * *